M. RUBIN.
Bottle-Stopper.
No. 224,479. Patented Feb. 10, 1880.
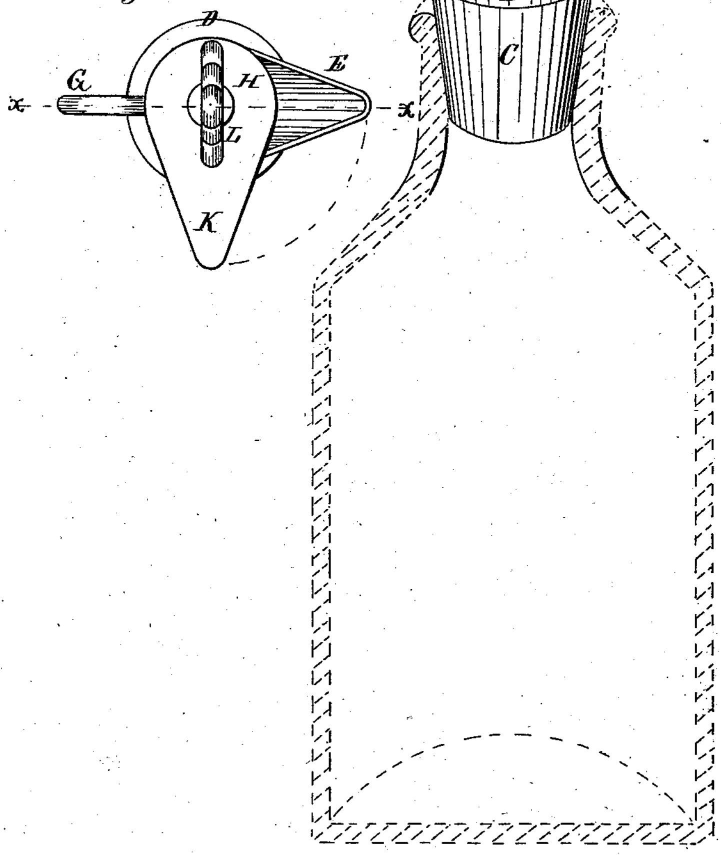
WITNESSES:
Henry N. Miller
C. Sedgwick
INVENTOR:
M. Rubin
BY Munn & Co
ATTORNEYS.
N. PETERS, PHOTO-LITHOGRAPHER, WASHINGTON, D. C.

UNITED STATES PATENT OFFICE.

MAX RUBIN, OF NEW YORK, N. Y.

BOTTLE-STOPPER.

SPECIFICATION forming part of Letters Patent No. 224,479, dated February 10, 1880.

Application filed December 26, 1879.

*To all whom it may concern:*

Be it known that I, MAX RUBIN, of the city, county, and State of New York, have invented a new and useful Improvement in Bottle-Stoppers, of which the following is a specification.

Figure 1 is a perspective view of my improvement. Fig. 2 is a plan view. Fig. 3 is a sectional side elevation taken through the line *x x*, Fig. 2. Fig. 4 is a sectional elevation of the hollow plug.

Similar letters of reference indicate corresponding parts.

The object of this invention is to furnish bottle-stoppers provided with discharge-spouts, and so constructed that the spouts may be covered and uncovered by closing and opening the stoppers.

The invention consists in constructing a bottle-stopper of a shell provided with a tube, cork, and flange for connecting it with a bottle, a discharge-spout for pouring out a liquid and an aperture to admit air, and a plug provided with a discharge-aperture, an aperture to admit air, and a flange to cover the discharge-spout of the shell, as will be hereinafter fully described.

A represents the outer part or shell of the stopper, to the bottom of which is secured, or upon it is formed, a tube, B. The tube B has a screw-thread formed upon its outer surface to receive a cork, C, which should be of a suitable size to fit into the mouth of the bottle to which the stopper is to be applied.

The bottom of the shell A has a downwardly-projecting flange, D, formed around its edge to overlap the upper end of the cork C, as shown in Fig. 3. Upon one side of the upper part of the shell A is formed a spout, E, for convenience in pouring out the liquid. In the side of the shell A opposite the spout E is formed an aperture, F, to admit air to the stopper, and thence to the bottle, when pouring out the liquid. To the side of the shell A opposite the spout E is attached, or upon it is formed, a handle, G, to cover and protect the air-hole F.

The cavity of the shell A may be made slightly tapering, and into it is fitted a hollow plug, H, the lower end of which is made open.

The plug H is kept in place in the shell A by a stop-pin, I, attached to the said plug H, and which projects through a slot, J, in the upper part of the side of the shell A. The slot J is made of such a length that the plug H can be turned one-quarter around, or nearly so.

Upon the edge of the top of the plug H is formed a flange, K, of such a shape as to cover the mouth of the spout E and project over the edge of the shell A, so that dust cannot get into the spout E when the stopper is closed, as shown in Fig. 1.

When the stopper is opened the cover K is turned to one side to uncover the spout E, as shown in Fig. 2, and allow the liquid to flow out.

Upon the top of the plug H is formed a handle, L, of any suitable shape, for convenience in turning the said plug to open and close the stopper. In the side of the plug H, beneath the cover K, is formed an aperture, M, for the discharge of the liquid. In the other side of the plug H is formed an aperture, N, to admit air to the stopper, and thence to the bottle, when the liquid is being poured out.

With this construction the stopper is opened by turning the plug H to bring the aperture M opposite the spout E, so that the liquid can flow out through the spout E. This movement of the plug H brings the aperture N of the plug opposite the aperture F of the shell, so that air can pass in to take the place of the liquid poured out. The stopper is closed by turning the plug H one-quarter around, which brings the apertures M N of the plug opposite the solid sides of the shell A, and the cover K over the spout E.

If desired, the flange D may be extended outward and downward and have a screw-thread upon its inner surface to adapt it to receive and be screwed upon the top of the bottle. In this case the cork C may be made small to serve as a packing to prevent leakage.

Having thus described my invention, I claim as new and desire to secure by Letters Patent—

1. As an improved article of manufacture, a bottle-stopper constructed as herein shown and described, consisting of the shell A, provided with the tube B, the flange D, the discharge-spout E, the air-aperture F, and the slot J, the plug H, provided with the cover K, the discharge-aperture M, the air-aperture N, and the stop-pin I, and the cork C, as set forth.

2. In a bottle-stopper, the combination, with the shell A, provided with the discharge-spout E and the slot J, of the hollow plug H, provided with the flange K and the stop-pin I, substantially as herein shown and described, so that the top of the spout E may be covered and uncovered by operating the stopper, as set forth.

MAX RUBIN.

Witnesses:
JAMES T. GRAHAM,
C. SEDGWICK.